United States Patent [19]
Spanelis

[11] 3,958,677
[45] May 25, 1976

[54] UNITARY PEDAL APPARATUS FOR SELECTIVELY ACCELERATING AND BRAKING A VEHICLE
[76] Inventor: Evangelos L. Spanelis, 116½ S. Main St., Yardley, Pa. 19067
[22] Filed: Sept. 18, 1974
[21] Appl. No.: 505,401

[52] U.S. Cl. ............................. 192/3 R; 192/3 S; 74/470; 74/513; 403/DIG. 1; 200/61.89
[51] Int. Cl.² ........................................ F16D 67/00
[58] Field of Search .................... 192/3 S, 3 R, 3 T

[56] References Cited
UNITED STATES PATENTS

| 2,083,940 | 6/1937 | Burton et al. | 192/3 S |
| 2,119,299 | 5/1938 | Smith | 192/3 S |
| 2,200,685 | 5/1940 | Anderson | 192/3 S |
| 2,453,054 | 11/1948 | Whiffen | 192/3 R |
| 3,495,692 | 2/1970 | Holgate | 192/3 R |

Primary Examiner—Benjamin W. Wyche
Attorney, Agent, or Firm—Sperry and Zoda

[57] ABSTRACT

A unitary pedal apparatus for selectively accelerating and braking a motor vehicle in which depressing the pedal actuates the master cylinder for braking and subsequent lessening of pedal pressure effects acceleration, the apparatus including a switch within the pedal for placing the throttle at idle position and another switch in response to braking of the vehicle which places the throttle in the idle position, both switches when closed effecting energization of a solenoid located adjacent the throttle bar in the linkage arrangement, the linkage arrangement including a lost motion device which is expandable to prevent deformation of the linkage in response to hard braking.

10 Claims, 6 Drawing Figures

UNITARY PEDAL APPARATUS FOR SELECTIVELY ACCELERATING AND BRAKING A VEHICLE

BACKGROUND OF THE INVENTION

In the operation of motor vehicles it has been usual heretofore to provide one pedal for actuating the vehicle brake and a second pedal for controlling the operation of the carburetor thereby performing as an accelerator pedal. However, in an emergency there is necessarily some delay due to the reaction time of the driver and the time required in shifting his foot from one pedal to the other. Also there is a substantial possibility of additional time required for the driver to coordinate the movement of both feet to actuate the brake and release the accelerator pedal simultaneously.

In order to limit the time delay between when a driver perceives an emergency and when the vehicle braking arrangement is initiated, it is advantageous to provide a combination braking and accelerating pedal. Various attempts have been suggested to overcome the problems of linkage arrangements which are inherent with a single pedal system. These systems are exemplified by the following U.S. Pat. Nos.:

| Pat. No. | Patentee |
|----------|----------|
| 2,483,224 | A. J. Narcovich |
| 2,124,970 | R. Walker |
| 3,386,541 | H. N. Luijt |
| 3,536,229 | Yedidya Boros |
| 3,630,326 | Kawaguchi |

One of the main problems with the prior art has been the extremely complicated linkage arrangements which have been required to utilize one pedal for both the braking and accelerating. The numberous linkage elements and points of junction make these systems very inefficient with excessive tolerances and problems of frequent breakage. The complication of the linkage was primarily due to the fact that these systems utilized a pivotal arrangement about a fulcrum. Usually the system employed was to utilize pressure at the top of the pedal to actuate one action and pressure at the heel of the pedal to actuate the other action. The problems associated with the prior art are overcome in applicant's invention utilizing the single pedal system as disclosed below.

SUMMARY OF THE INVENTION

In this invention a single pedal system is provided for actuating braking and accelerating of a motor vehicle. Use is made of a standard brake pedal arrangement. In such standard arrangements it is usual for the linkage between the brake pedal and the master cylinder to be adjusted such as to allow for a minimal amount of play between the point when the operator first contacts the pedal with his foot and when the pedal actually initiates braking. The distance of this play is usually in the range of one to 1½ inches. This invention makes use of this tolerance for acceleration.

The pedal comprises a two-plate system separated by a spring and pivotally attached along one edge thereof. Located under the bottom plate is a normally closed switch. Whenever this switch is closed, the vehicle throttle lever is in the idling position. When the operator places his foot on the pedal the switch in the pedal opens thereby allowing acceleration. As the driver depresses the pedal, the motor of the vehicle remains at idle. Once the pedal is depressed to the point that braking is initiated the driver may now slowly release the pedal and the vehicle will accelerate. Of course, if the driver releases his foot the vehicle will again return to idle. At any time during the acceleration of the behicle the driver may immediately depress the pedal and thereby engage the master cylinder for braking.

The linkage apparatus for acceleration is subject to being overstressed whenever very hard braking is performed or any other action which requires the brake pedal to be depressed completely to the floor such as bleeding the brake system. In order to prevent breakage of the accelerator linkage between the carburetor and the pedal, an expandable link element is provided therebetween. This element will absorb any overstressing of the throttle linkage.

Acceleration is accomplished by the use of a solenoid and rod arrangement. The rod is attached to the throttle lever which actuates the throttle plate to cause vehicle acceleration. The solenoid has a coaxial longitudinal aperture therethrough in which the rod protrudes. At all times the solenoid is freely movable along the rod in one direction. In the other direction along the rod the solenoid is movable only when energized. If the solenoid is de-energized and the solenoid is moved in this other direction the rod is forced to move with it. This de-energized movement of the solenoid actuates acceleration. The solenoid is energized by the closed condition of the switch in the pedal which exists whenever no pressure is being applied to the pedal. In addition, the solenoid is energized whenever the brake switch is closed. The brake switch is integral with the master cylinder such that whenever braking is initiated the brake switch is closed. The closing of the brake switch allows the rod to move freely within the solenoid thereby allowing the throttle return spring to return the throttle lever to the normally idling position. This is necessary to prevent overreving of the vehicle engine during hard braking.

It is an object of this invention to provide a single pedal system for actuating braking and accelerating of a motor vehicle.

It is an object of this invention to provide a single pedal system for operating a motor vehicle which is simpler and utilizes less moving parts and linkage elements.

It is an object of this invention to provide a single pedal system for operating the motor vehicle which utilizes simple downward and upward movement of the pedal.

It is an object of this invention to provide a single pedal system for operating a motor vehicle whereby the vehicle is automatically returned to idle during an emergency when the driver is forced to remove his foot from the pedal.

It is another object of this invention to provide a single pedal system for operating a motor vehicle whereby the vehicle motor is immediately returned to idling whenever hard braking is effected.

It is another object of this invention to provide a single pedal system for operating the motor vehicle whereby overstressing of the mechanical linkage is prevented during hard braking.

It is an object of this invention to provide a single pedal element for operating a motor vehicle which is simpler in operation and requires less time to change from the accelerating mode to the braking mode or vice versa.

It is an object of this invention to provide a single pedal element system for operating a motor vehicle which is more reliable and efficient.

BRIEF DESCRIPTION OF THE DRAWINGS

While the invention is particularly pointed and distinctly claimed in the concluding portions herein a preferred embodiment is set forth in the following detailed description which may be best understood when read in connection with the accompanying drawings in which;

DETAILED DESCRIPTION OF THE PREFERRED EMBODIMENT

Figure 1:
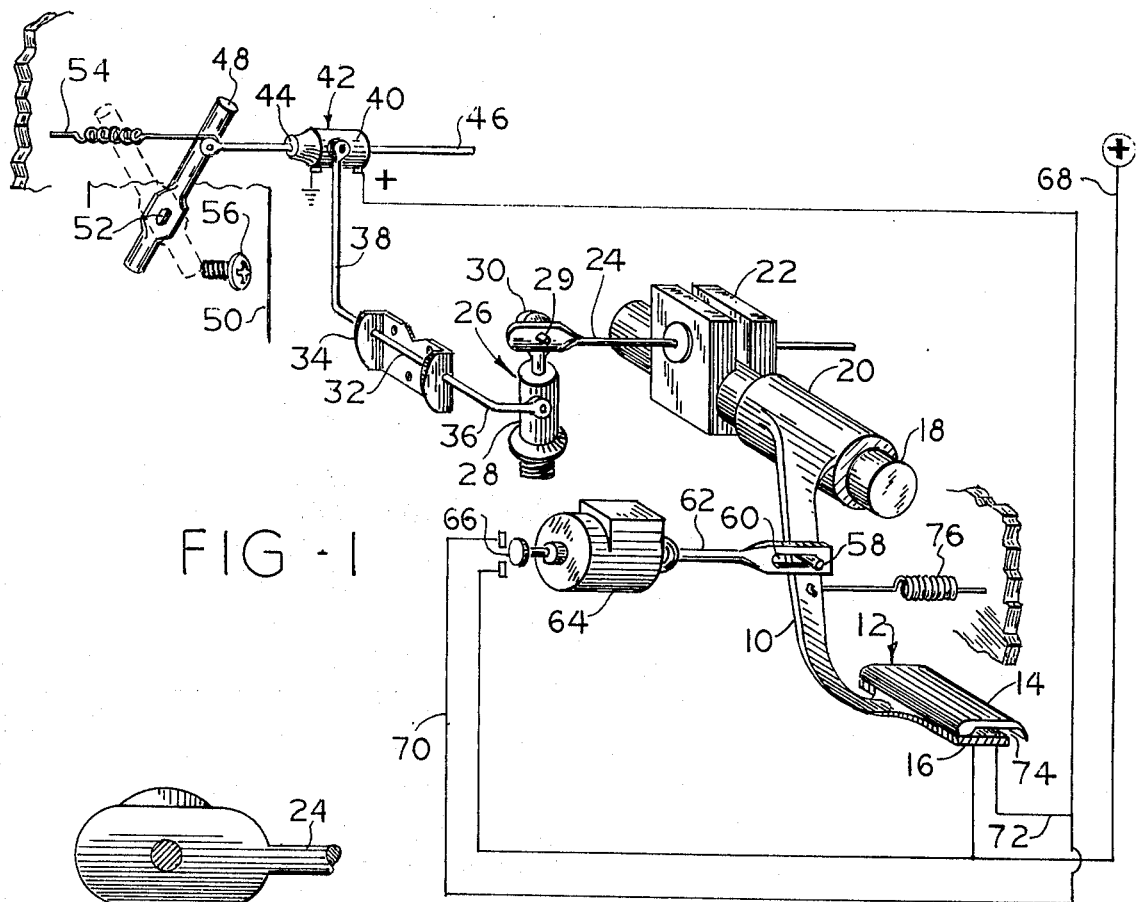
FIG. 1 is a perspective view of the entire linkage system when installed in accordance with the present invention.

FIG. 1 illustrates a pedal generally designated as 12 fixedly attached to the lower end of a pedal arm 10. Through the increasing or decreasing of pressure upon this pedal by the operator of the vehicle the braking or accelerating can be selectively actuated. When the operator increases pressure on pedal 12 this will cause the braking of the vehicle. When the pressure is decreased on pedal 12 this will cause solenoid assembly 42 to increase the acceleration of the vehicle by moving throttle lever 48 in a clockwise direction about mounting point 52. In this manner by allowing two entirely different movements to comprise braking and acceleration a completely foolproof system of safe operation of a vehicle is created.

Pedal 12 has a top plate 14 and a bottom plate 16 which are pivotally mounted together. During operation of the brake, the driver applies pressure to top plate 14 which moves downward until it contacts bottom plate 16. Bottom plate 16 is fixedly attached to pedal arm 10, such that when top plate 14 and bottom plate 16 are compressed pedal arm 10 moves downwardly. The opposite end of pedal arm 10 is fixedly mounted on rotatably shaft 18. One particular means of mounting could be by use of journal 20 as shown in FIG. 1.

Shaft 18 can be any conveniently mounted cylindrical bar located usually under the dash board or adjacent the fire wall (not shown). At another point on shaft 18 is a blocked mounting element 22.

FIG. 1 illustrates a lever 24 which is secured to shaft 18 by means of locking block 22. In operation it is now apparent that when pedal 12 is pressed downwardly by the operator of the motor vehicle, pedal arm 10 is forced downwardly which rotates shaft 18 in a clockwise direction. This movement thereby moves lever 24 upwardly.

Lever 24 is connected to expandable linkage element, generally designated as 26, by pin 29. Expandable element 26 has a shell portion 28 and a piston portion 30. Expandable element 26 functions such that whenever excessive pressure is applied to move piston 30 upwardly shell 28 will remain substantially stationary and thereby prevent overstressing of the linkage assembly. Crank element 32 is mounted in bracket 34. Bracket 34 is conveniently secured to any available flat surface in the vehicle. Lower portion 36 of crank bar 32 is secured to shell 28 of expandable element 26. Upper portion 38 of crank bar 32 protrudes upwardly and is secured to the casing 40 of solenoid 42.

Solenoid 42 has a longitudinal axial aperture 44 through which protrudes rod 46. Rod 46 is secured at one end to throttle lever 48 which is mounted upon carburetor 50 at pivotal mounting point 52. FIG. 1 illustrates throttle lever 48 in the accelerating position. Throttle return spring 54 is utilized to return throttle arm 48 to the idle position whenever force is not being applied by the upstream linkage.

Throttle return spring 54 returns throttle lever 48 to the idling position in which throttle arm 48 abuts idle adjustment screw 56. The idling position of throttle arm 48 is illustrated in dotted outline on FIG. 1.

Pedal arm 10 is provided with a stud 58 which protrudes from the side of the pedal arm into slot 60 of brake bar 62. In the normal position, stud 58 is in the rightmost section of slot 60 such that when braking is desired the distance from one end of slot 60 to the other end of slot 60 represents the distance of the "play" in the brake pedal movement. Brake bar 62 is connected to master cylinder 64 which operates the braking system of the motor vehicle. Thus, when stud 58 is pressed against the leftmost edge of slot 60, bar 62 is pressed into master cylinder 64 and braking action occurs.

Brake bar 62 and master cylinder 64 are connected to brake switch 66. Brake switch 66 is electrically interposed between battery lead 68 and brake lead 70. Battery lead 68 connects one side of switch 66 to the positive terminal of the vehicle battery. The other end of switch 66 is connected to the solenoid 42. Brake switch 66 is normally open which allows solenoid 42 to be de-energized. However, whenever master cylinder 64 is actuated to brake, then switch 66 will become closed and provide current to solenoid 42 such that the solenoid will become energized. Another switch 74 is provided in the pedal 12. One side of switch 74 is connected to pedal lead 72 and the other side of switch 72 is connected to battery lead 68. Switch 74 is normally closed whenever there is no pressure being applied to top plate 14. Thus when pedal 12 is in the relaxed position solenoid 42 will be energized. However, when pressure is applied to top plate 14 switch 74 will become open thereby providing electrical de-energizing solenoid 42. It should be appreciated that the switch 66 and lead lines 70 can be completely deleted while still allowing the above application to function properly. Under some vehicle and engine conditions, it might be desirable to include switch 66 and line 70, but they are not required and are merely optional.

Solenoid 42 is structured such that it will function to freely move to the left along rod 46 whether the solenoid is energized or de-energized. Solenoid 42 can also move freely to the right when energized. However, there cannot be a relative motion of rod 46 to the left or solenoid 42 to the right whenever the solenoid is de-energized.

FIG. 1 also illustrates a pedal arm return spring 76 which is adapted to return pedal 12 to the normal relaxed position whenever the driver removes his foot from the pedal.

Figure 2:
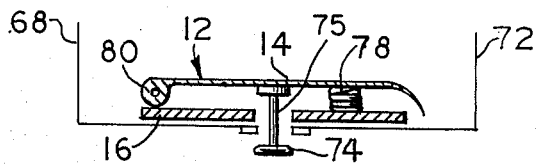
FIG. 2 is a side schematic view of the pedal assembly when the top plate and spring are depressed downwardly.

FIG. 2 illustrates the pedal assembly when in the depressed position. FIG. 2 shows the position which the top plate 16 will assume whenever the slightest bit of pressure is being applied to pedal 12. FIG. 2 illustrates a pedal spring 78 which is mounted between to the bottom surface of top plate 14 and a top surface of bottom plate 16 and urges them apart.

In this embodiment top plate 14 and bottom plate 16 are connected along one edge by hinge 80. Thus, when top plate 14 is depressed downwardly spring 78 will be compressed and top plate 14 and bottom plate 16 will close together being restricted by hinge 80.

Figure 3:
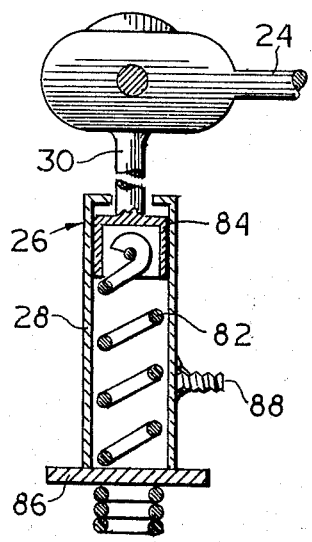
FIG. 3 is a side sectional view of the expandable linkage element in the expanded position.

FIG. 3 illustrates the expanded position of expandable element 26. In FIG. 3 shell element 28 is shown as a hollow cylindrical element. Located within shell element 28 is piston spring 82. The end of piston spring 82 passes through the head 84 of piston 30 such that it is secured thereto. The opposite end of spring 82 extends through the open lower section of shell 28. The bottom of shell 28 is provided with a platform 86 which has an aperture therethrough (not shown). This aperture abuts the lower end of shell 28 such that spring 82 is restricted in its upward movement. Thus, when piston 30 is pulled upwardly by force exerted from lever 24 the portion of spring 82 above platform 86 will expand and allow expansion of the linkage without damage. It should be appreciated that platform 86 is adjustable along the length of spring 82 such as to vary the tension of the segment of spring 82 between platform 86 and piston 30. Platform 86 is essentially in the form of a conventional washer which can be adjusted along the length of spring 82. The wire of spring 82 passes through the center hole of platform 86 therefore platform 86 can be adjusted up or down to vary the amount of spring which is above the platform with respect to the amount of spring which is below the platform. In this manner the amount of spring above the platform can be adjusted and therefore the tension of the active portion of spring 82 within the expandable element 26 can be adjustable. FIG. 3 shows expandable element 26 in this expanded position. The shell 28 is also provided with a connection 88 which is the point of attachment to the lower portion 36 of crank bar 32.

Figure 4:
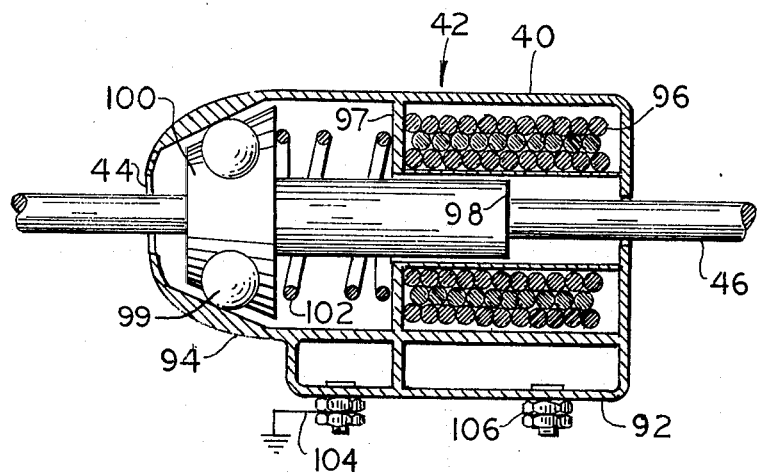
FIG. 4 is a side sectional view of the rod and solenoid in the de-energized state.

FIG. 4 illustrates the detailed construction of the solenoid. Basically the solenoid has a casing 40 which is divided into a rear section 92 and a front section 94. Aperture 44 extends through both sections. The rear section 92 is separated from front section 94 by wall 97. The internal annular section of rear section 92 houses coil 96. The inside diameter of armature 98 defines the aperture through which rod 46 protrudes in both directions. Inside of front section 94 and attached to the forward point of armature 98 is bearing 100. Spring 102 abuts bearing 100 and wall 97 and is wrapped around the portion of armature 98 which extends from wall 97 to bearing 100 in front section 94.

Spring 102 urges bearing 100 and consequently also urges armature 98 to a forward position such that bearing 100 contacts the inside surface of front section 94. Bearing 100 is structured such that when it presses against the inside surface of front section 94 it also exerts pressure on rod 46 such that rod 46 cannot be moved toward the front direction. However, it should be appreciated that rod 46 can be moved toward the rearward section because due to the compression of bearing 100 on rod 46, bearing 100 will move to the right when rod 46 is moved to the right thereby slightly compressing spring 102 and pulling bearing 100 away from the innersurface of front section 94. Thus we see that in the de-energized condition rod 46 is movable in relation to solenoid 42 in the rightwardly direction only, and not in the leftwardly directon. To facilitate the locking of shaft 46 the bearing 100 is provided with a plurality of large ball bearings 99. When rod 46 is urged to the left, balls 99 will be urged against inclined surface 95 and thereby direct an inward force against the periphery of rod 46 to prevent any further movement in the left direction. In this manner when deenergized solenoid 40 will prevent rod 46 from moving to the left with respect thereto but will allow completely free movement of rod 46 in the rightward direction with respect thereto.

Of course, when energized spring 102 will be compressed and rod 46 will have complete freedom of movement to the left and to the right since bearing 100 and ball bearings 99 will be prevented from abutting inclined surface 95.

Figure 5:
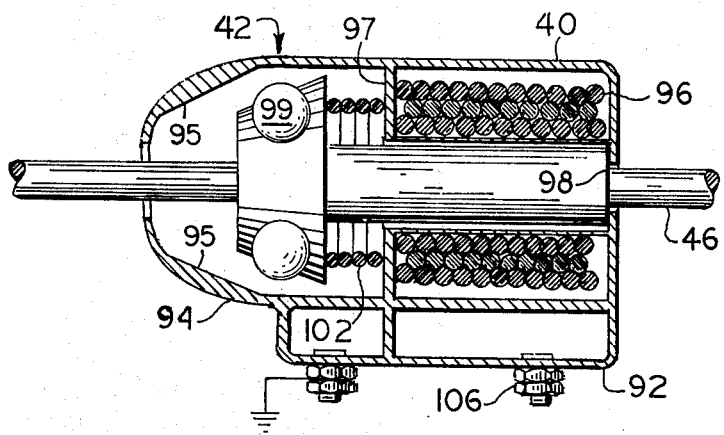
FIG. 5 illustrates the apparatus of FIG. 4 with the solenoid in the energized state.

FIG. 5 illustrates the same apparatus as FIG. 4 but in the energized condition. Energization is accomplished through connection of the positive battery terminal to the solenoid hot connection point 106. To provide a full electrical circuit solenoid 42 is grounded at connection 104. The energized solenoid as shown in FIG. 5 will have electrical flow through coil 96 thereby moving armature 98 toward the rear section. This movement will consequently compress spring 102 and move bearing 100 away from the tapered innersurface of front section 94. Thus, without pressure from the inside surface of front section 94 bearing 100 will not restrict the movement of rod 46 in a forward or a backward direction. Thus rod 46 will be freely movable and will be urged by throttle return spring 54 back to the idling position.

Figure 6:
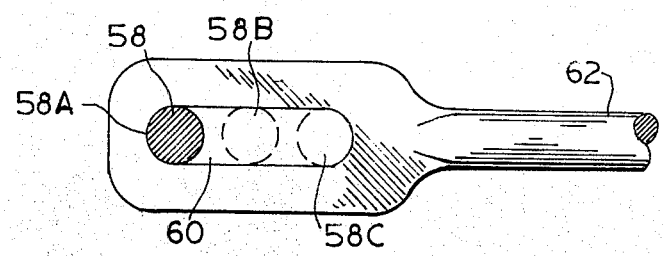
FIG. 6 is a side view showing the opposite side shown in FIG. 1 of the slotted brake bar with the pedal arm stud at three different locations thereby effecting idling, acceleration and braking.

FIG. 6 illustrates the position of the stud 58 in slot 60 at various positions of pedal 12. Point 58a shows stud 58 at the relaxed position. Point 58b shows a dotted outline of stud 58 when in the accelerating position. Dotted outline 58c shows the position of stud 58 when in the braking position.

In the normal relaxed state, this system will allow the engine to remain at the idle position. This effect is accomplished through the normally closed switch 74 in pedal 12 which supplies the electrical communication between the positive terminal of the vehicle battery and solenoid 42. Normally closed switch 74 is actuated by a cam means 75 or the like protruding below the lower surface of pedal 12. In this energized state, solenoid 42 allows rod 46 free movement in and out of aperture 44 such that spring 54 is allowed to return throttle lever 48 to the idling position with the bottom edge thereof abutting throttle adjustment screw 56.

When the driver desires acceleration, he will place his foot upon top plate 14. Immediately upon exertion of a downward force, the first movement will be to compress plate spring 78 and thereby open switch 74. As top plate 14 moves downward as far as allowed by spring 78 toward bottom plate 16 about hinge 80, the solenoid 42 will become de-energized. When top plate 14 is fully collapsed against bottom plate 16, then pedal arm 10 will start to move against the pulling force of pedal return spring 76. As pedal arm 10 is moved downward, shaft 18 will rotate clockwise. This clockwise movement will cause lever 24 to move upwardly which will pull on piston 30. The upward force on piston 30 will pull spring 82 upward and thereby cause shell 28 and expandable element 26 to move upwardly. The movement of expandable element 26 will cause crank arm 32 to rotate thereby moving de-energized solenoid 42 left along the rod 46. It should be noted that in the de-energized state, solenoid 42 can freely move to the left along rod 46. However, if solenoid 42 is attempted to be moved to the right, rod 46 will remain stationary within aperture 44 the entire rod 46 will be moved to the right as during acceleration. As above described, the rod 46 will remain stationary within the solenoid 40 during any relative movement therebetween which would cause the solenoid to move to the right or the rod 46 to move to the left. In this respect, during acceleration, solenoid 40 will be moved to the right and will be de-energized. In this state, rod 46 will be forced to travel along with the movement of solenoid 40 since the balls 99 will be bound therein between inclined surface 95 and the periphery of rod 46.

To accelerate the driver will depress pedal 12 until stud 58 reaches the extreme left end of slot 60 which is shown in FIG. 6 as point 58c. At this point, solenoid 42 will be moved substantially to the left along rod 46. Just prior to actuating the master cylinder, the driver will reverse movement of pedal arm 10 by lessening the pressure which he is applying to top plate 14. This will cause pedal arm 10 to move to the right and shaft 18 to move counter clockwise. In this fashion solenoid 42 will start to move to the right and in its de-energized state it will clamp rod 46, which will also start to move to the right. Movement of rod 46 to the right causes throttle lever 48 to resist the force of return spring 54 and move away from idling screw 56 thereby effecting acceleration. Movement of rod 46 to the right results from, as above, the compression of balls 99 between incline surface 95 and the outer surface of rod 46. In this manner the solenoid 40 will act as a one way clutching means since free movement of rod 46 is possible within the energized solenoid whereas with the de-energized solenoid movement of the rod therein is only allowed in one direction. The less pressure applied on pedal 12, the greater the movement of rod 46 will be in the rightwardly direction and, therefore, the greater acceleration imparted by throttle lever 48.

The driver will then maintain the level of pedal 12 such that he maintains his desired speed. If at any time during acceleration or at constant speed of operation, the driver desires to apply the brakes, he may do so by immediately effecting downward force on pedal 12 without removing his foot. This will cause pedal arm 10 to move downward to the 58c position rapidly and will exert a force on brake bar 62 which will actuate master cylinder 64 to apply the braking system. In addition, brake switch 66 will be closed which energizes solenoid 42 and thereby allows rod 46 to freely move to the left and place throttle lever 48 in the idling position to prevent the motor from stalling during braking.

If the braking is especially hard, the movement of pedal arm 10 may cause overstressing of the linkage between shaft 18 and throttle arm 48 such as to cause linkage bending. This problem is prevented through the use of expandible element 26 which will absorb any overstressing of the throttle linkage by allowing piston 30 to pull away from the shell 28 such that the excess forces will be assumed by piston spring 82.

While a particular embodiment of this invention has been shown in the accompanying drawings and description above, it will be apparent that many changes may be made in the form, arrangement and position of the various elements of the combination. In consideration thereof, it should be understood that preferred embodiments of this invention disclosed are intended to be illustrative only and not intended to limit the scope of the invention.

I claim:
1. A unitary pedal apparatus for selectively accelerating and braking a vehicle comprising:
  a. a pedal;
  b. a normally closed pedal switch, being integral with said pedal and responsive to open upon the application of slight pressure on said pedal;
  c. a pedal arm with said pedal affixed to one end thereof;
  d. a shaft with the other end of said pedal arm affixed thereto;
  e. a lever secured to said shaft;
  f. an expandable mechanical linkage element attached to said lever to absorb any overstressing of the mechanical linkage;
  g. a crank bar connected to said expandable element;
  h. a solenoid fixedly attached to said crank bar, said solenoid including a one-way clutching means, said solenoid having a longitudinal aperture therethrough;
  i. a rod protruding through said aperture of said solenoid, said rod being secured to the throttle of the vehicle;
  j. a brake bar abutting said arm and responsive to sufficient movement of said arm to actuate the master cylinder of the vehicle for braking;
  k. a battery lead electrically connecting the vehicle battery to the positive side of said pedal switch; and
  l. a pedal lead electrically connecting the negative side of pedal switch to said solenoid which allows said solenoid to be energized when said pedal switch is closed.

2. The apparatus as defined in claim 1 further comprising:
  a. a normally open brake switch adjacent said brake bar and the master cylinder and adapted to close upon the actuation of the master cylinder by said brake bar, the positive side of said switch being electrically connected to said battery lead; and
  b. a brake lead electrically connecting said solenoid to the negative side of said switch such that when said brake switch is closed said solenoid is energized.

3. The apparatus as defined in claim 1 wherein said pedal further comprises:
  a. a top plate;
  b. a bottom plate, pivotally attached to said top plate, said bottom plate being fixedly attached to said pedal arm;
  c. a plate spring attached to the underside of said top plate and attached to the top side of said bottom plate; and
  d. a cam attached to the undersurface of said top plate and abutting said pedal switch, said cam adapted to open said pedal switch when a downward force is applied to said top plate.

4. The apparatus as defined in claim 1 wherein said solenoid further comprises:
 a. a cylindrical casing divided longitudinally into first and second sections;
 b. a wall separating the first and second sections;
 c. a core of tubular shape located longitudinally axial in the center of said casing, said tubular core having an inside diameter larger than the outside diameter of said rod, the inside of said core defining said aperture, said core being axially movable into the first and second sections of said casing;
 d. a field winding wrapped around said core in the second section of said casing;
 e. a one-way clutching means comprising an annular bearing fixedly attached to the end of said core; and
 f. a solenoid spring abutting said bearing at one end abutting said separating wall at the other end, said solenoid spring urging said bearing against the innerside of the first section of said casing thereby compressing said bearing and firmly gripping said rod.

5. The apparatus as defined in claim 1 wherein said expandable mechanical linkage element comprises:
 a. a cylindrical hollow shell connected to said crank bar;
 b. a platform abutting the lower end of said shell;
 c. a piston spring rigidly attached to and passing through said platform, a top portion of said spring extending into said shell, a bottom portion of said spring extending below said platform; and
 d. a piston fixedly attached to the end of said top spring portion, said piston being connected to said lever.

6. The apparatus as defined in claim 5 wherein said platform is adjustable to allocate said spring in varying proportions to the top and bottom portions thereof.

7. The apparatus as defined in claim 7 wherein said brake bar defines a slotted end and wherein said apparatus further comprises a stud integral with said pedal arm and protruding into said slot to allow minimal movement of said pedal arm prior to responsive movement of said brake bar.

8. The apparatus as defined in claim 1 further comprising a brake return spring attached at one end to said pedal arm and attached at the other end to the vehicle body.

9. The apparatus as defined in claim 1 further comprising a throttle return spring attached at one end to the vehicle body and at the other end to said rod to urge the throttle to the idle position.

10. The apparatus as defined in claim 1 further comprising a throttle return spring attached at one end to the vehicle body and at the other end to the throttle to urge the throttle to the idle position.

* * * * *

UNITED STATES PATENT AND TRADEMARK OFFICE
CERTIFICATE OF CORRECTION

PATENT NO. : 3,958,677
DATED : May 25, 1976
INVENTOR(S) : Evangelos L. Spanelia

It is certified that error appears in the above-identified patent and that said Letters Patent are hereby corrected as shown below:

In Claim 4(f), after the word "end" insert -- and --, in line 1.

In Claim 7, line 1, change "7" to -- 1 --.

Signed and Sealed this

Twentieth Day of September 1977

[SEAL]

Attest:

RUTH C. MASON
Attesting Officer

LUTRELLE F. PARKER
Acting Commissioner of Patents and Trademarks